United States Patent [19]

Hunter et al.

[11] Patent Number: 4,863,753

[45] Date of Patent: Sep. 5, 1989

[54] REDUCED CALORIE PEANUT BUTTER

[75] Inventors: John E. Hunter, Cincinnati, Ohio; Jack R. Eck, Newport, Ky.

[73] Assignee: The Procter & Gamble Company, Cincinnati, Ohio

[21] Appl. No.: 213,650

[22] Filed: Jun. 30, 1988

[51] Int. Cl.$^4$ ............................ A23L 1/36; A23D 5/00
[52] U.S. Cl. ...................................... 426/633; 426/607
[58] Field of Search .............................. 426/607, 633

[56] References Cited

U.S. PATENT DOCUMENTS

| | | | |
|---|---|---|---|
| 2,521,243 | 9/1950 | Mitchell, Jr. | 426/633 |
| 2,667,418 | 1/1954 | Barsky et al. | 99/139 |
| 2,874,056 | 2/1959 | Drew | 426/607 |
| 3,006,771 | 10/1961 | Babayan | 426/607 |
| 3,210,197 | 10/1965 | Galenkamp | 426/607 |
| 3,278,314 | 10/1966 | Colby et al. | 426/633 |
| 3,353,964 | 11/1967 | Seiden | 426/607 |
| 3,450,819 | 6/1969 | Babayan et al. | 514/557 |
| 3,865,939 | 2/1975 | Jandacek | 424/238 |
| 4,049,833 | 9/1977 | Gannis et al. | 426/93 |
| 4,198,439 | 4/1980 | Hoover | 426/632 |
| 4,329,375 | 5/1982 | Holloway et al. | 426/632 |
| 4,355,051 | 10/1982 | Pominski et al. | 426/632 |
| 4,528,197 | 7/1985 | Blackburn | 424/312 |
| 4,607,052 | 8/1986 | Mendy et al. | 210/410.7 |
| 4,753,963 | 6/1988 | Jandacek et al. | 426/607 |

FOREIGN PATENT DOCUMENTS

| | | |
|---|---|---|
| 1468042 | 2/1967 | France. |
| 61-12247 | 1/1986 | Japan. |
| 2007961A | 5/1979 | United Kingdom. |

OTHER PUBLICATIONS

U.S. Ser. No. 132,400 (Seiden), Filed 12/15/87.
Senior, *Medium Chain Triglycerides*, Univ. of Pennsylvania Press, pp. 283, 285, 1968.
Bach et al., "Medium Chain Triglycerides: An Update", *The American Journal of Clinical Nutrition*, 36, pp. 950–962.
Worthington et al., "Variability in Fatty Acid Composition Among Arachis Genotypes: A Potential Source of Product Improvement", JAOCS 54 (2), pp. 105A–108A (Abstract).
Mok et al., "Structured Medium Chain and Long Chain Triglyceride Emulsions are Superior to Physical Mixtures in Sparing Body Protein in the Burned Rat", Metabolism, vol. 33, No. 10, pp. 910–915.
Maiz et al., "Protein Metabolism During Total Parenteral Nutrition (TPN) in Injured Rats Using Medium Chain Triglycerides", Metabolism, vol. 33, No. 10, pp. 901–909.
U.S. Ser. No. 102,071 (Yang), Filed 9/29/87.

*Primary Examiner*—Donald E. Czaja
*Assistant Examiner*—Helen Pratt
*Attorney, Agent, or Firm*—Gary M. Sutter; Ronald L. Hemingway; Richard C. Witte

[57] ABSTRACT

The present invention relates to a reduced calorie peanut butter wherein the oil phase comprises triglycerides containing at least about 10% by weight medium chain fatty acids. Preferably, medium chain triglycerides are used in the oil phase. It has been found that use of these triglycerides allows the desired peanut butter consistency to be maintained at lower levels of total oil.

18 Claims, No Drawings

REDUCED CALORIE PEANUT BUTTER

TECHNICAL FIELD

This invention relates to peanut butters. More particularly, the invention relates to a reduced calorie peanut butter in which the oil phase contains triglycerides esterified with medium chain fatty acids.

BACKGROUND OF THE INVENTION

It is known that peanut butter consists of a mixture of solid nut particles and liquid peanut oil which is generally made by roasting and blanching raw peanut kernels and then grinding hem. The grinding operation breaks the cellular structure of the peanut kernels and liberates oil in which the comminuted nut particles are suspended to form a product having a pasty and spreadable consistency. This product is generally called the peanut "paste". A stabilizer is usually added to the peanut paste in making peanut butter to prevent oil separation, and optionally other ingredients are added such as an emulsifier, a sweetener and salt.

Peanut butter has high nutritional value as a good source of protein. The protein content of a typical peanut butter is around 29%. Unfortunately, the high oil content of peanut butter (typically around 50%) also causes it to be very high in calories. Hence, the nutritional appeal of peanut butter is partly offset by its high caloric content. Therefore, it would be desirable to have a peanut butter that is still high in protein but that contains a reduced amount of oil.

There have been various attempts in the art to make improved peanut butters. For example, British Patent Application 2,007,961A of Sharma, published May 31, 1979, discloses a low calorie peanut spread comprising a dispersion of finely divided peanut meat in a continuous oil phase. The spread has a reduced oil content of 20–35% and an oil to peanut protein ratio of 1:2 to 4:3.

Additionally, U.S. Pat. No. 3,865,939 of Jandacek, issued Feb. 11, 1975, discloses a hypercholesterolemic oil suitable for use in peanut butter comprising a liquid glyceride base oil, 2.0–6.9% of a plant sterol, and a solubilizing agent for the sterol. The base oil can comprise triglycerides in which one or more short chain fatty acids, such as acetic or propanoic acid, replace in part the long chain fatty acids present in natural triglyceride oils.

Several patents disclose methods for making low-fat nuts such as peanuts. For example, U.S. Pat. No. 4,329,375 of Holloway et al., issued May 11, 982, discloses a process in which the nuts are initially roasted to develop a roasted flavor and color prior to pressing them to remove only a limited amount of the oil. After the initial roasting, the nuts are hydrated and equilibrated for a period of time to obtain a uniform moisture content within the range of from about 4% to 8%. The hydrated nuts are then pressed to remove from about 20% to about 55% of the oil and then hydrated to a moisture content sufficient to cause the nuts to regain approximately their normal shape prior to a final roasting to fully develop the flavor and color of the nuts.

U.S. Pat. No. 4,049,833 of Gannis et al., issued Sept. 20, 1977, discloses a process in which partially defatted nuts are contacted with a glycerol-containing solution until at least a portion of the solution is absorbed by the nuts and the nuts have regained their original size and shape. The nuts are then removed from contact with the solution and roasted to provide partially defatted nuts having improved flavor and texture.

Medium chain triglycerides (MCT's) are known to the art for use as a substitute for typical triglyceride fats. MCT's are triglycerides esterified with saturated $C_6$ to $C_{12}$ fatty acids. These medium chain triglycerides are metabolized differently from long chain triglycerides by the body because they are more water-soluble. In addition, they hydrolyze rapidly and are absorbed via the portal vein, providing a source of quick energy. A discussion of medium chain triglycerides is provided by Bach et al., "Medium-Chain Triglycerides: an Update," *The American Journal of Clinical Nutrition* 36, Nov. 1982, pp. 950–962.

There is no mention in these references of a way to make a peanut butter that is reduced in calories through a reduction in the amount of peanut oil and total oil, while at the same time maintaining the desired consistency of the peanut butter.

Therefore, it is an object of the present invention to provide a peanut butter that is reduced in calories.

It is another object of the present invention to provide a reduced calorie peanut butter in which the calorie reduction is achieved by the replacement of at least a portion of the peanut oil with triglycerides containing medium chain fatty acids.

It is a further object of the present invention to make a reduced calorie peanut butter that has a lower level of total oil, while at the same time having an excellent consistency.

These and other objects of the invention will become evident from the disclosure herein.

All parts, percentages and ratios used herein are by weight unless otherwise indicated.

SUMMARY OF THE INVENTION

The invention is a peanut butter comprising a dispersion of finely divided peanut particles in a continuous oil phase, wherein the oil phase comprises triglycerides containing at least about 10% by weight medium chain fatty acids. Preferred triglycerides for use in the invention are medium chain triglycerides. The peanut butter is reduced in calories while maintaining an excellent consistency.

DETAILED DESCRIPTION OF THE INVENTION

The present invention relates to a reduced calorie peanut butter in which at least a portion of the peanut oil is replaced by triglycerides containing medium chain fatty acids. Preferably, medium chain triglycerides are used. It has been surprisingly discovered that these triglycerides have a greater effect on peanut butter consistency than the peanut oil they replace. Accordingly, a lower oil replacement level can be used without sacrificing the excellent consistency of the peanut butter. Moreover, the addition of medium chain triglycerides to the peanut butter is advantageous because MCT's are reduced in calories and they are digested like carbohydrates to provide a source of quick energy. The combination of the lower level of total oil and the use of MCT's results in a peanut butter that is lower in calories and proportionately higher in protein than regular peanut butters, while maintaining the desired peanut butter consistency.

Specifically, the present invention is a peanut butter comprising a dispersion of finely divided peanut particles in a continuous oil phase, wherein the oil phase comprises triglycerides containing at least about 10% by weight medium chain fatty acids. Preferably, the peanut butter comprises from about 20% to about 70% by weight continuous oil phase and from about 30% to about to about 80% by weight peanut particles, and more preferably from about 30% to about 60% oil phase and from about 40% to about 70% peanut particles. Under the peanut butter definition and standards of quality, Federal Register 29, 15, 173-174, No. 220 (1964), the total oil content of peanut butter may not exceed 55%. Therefore, the most preferred peanut butter of the present invention comprises from about 35% to about 55% by weight continuous oil phase and from about 45% to about 65% by weight peanut particles. However, it is not intended to limit the broad scope of this invention to compositions within the standards of identity; the invention can include peanut "spreads" as well as peanut butter. In addition, it is preferred that the weight ratio of continuous oil phase to peanut particles be from about 40:60 to about 50:50, preferably about 45:55.

Triglycerides Containing Medium Chain Fatty Acids

As discussed hereinabove, the oil phase of the present peanut butter comprises triglycerides containing at least about 10% by weight medium chain fatty acids.

By "medium chain fatty acids," as used herein, is meant caproic acid ($C_{6:0}$), caprylic acid ($C_{8:0}$), and capric acid ($C_{10:0}$). In this listing of fatty acid moieties, the common name of the fatty acid is given followed by its $C_{x:y}$ designation, wherein x is the number of carbon atoms and y is the number of double bonds.

Preferably, the triglycerides contain at least about 30% by weight medium chain fatty acids, more preferably at least about 50%, more preferably at least about 70%, and most preferably at least about 90% by weight medium chain fatty acids.

The weight percentage of medium chain fatty acids is calculated as a percentage of the total fatty acids from all the triglyceride sources in the oil phase. For example, where the oil phase consists of 93% medium chain triglycerides, 5% rapeseed hardstock (stabilizer) and 2% peanut oil, the total fatty acids are determined by adding the fatty acids from the medium chain triglycerides, hardstock and peanut oil. The method for measuring fatty acid composition is described below in the Analytical Methods section.

The triglycerides containing medium chain fatty acids can be incorporated into the present peanut butter by any method. A potential method is by the use of peanuts that have been genetically engineered to alter the natural peanut oil fatty acid composition. (Peanut oil is high in oleic, linoleic and palmitic acids and it does not contain medium chain fatty acids.)

However, the preferred method for introducing medium chain fatty acids is to remove peanut oil from the peanut paste and replace it with triglycerides containing medium chain fatty acids. Most preferably, these triglycerides are "medium chain triglycerides".

Medium chain triglycerides (MCT's) are triglycerides esterified with saturated $C_6$ to $C_{12}$ fatty acids, predominantly $C_8$ and $C_{10}$. These shorter chain triglycerides are metabolized differently by the body because they are more water-soluble than long chain triglycerides. Long chain triglycerides are hydrolyzed into long chain fatty acids and monoglycerides, absorbed, reesterified, incorporated into chylomicron structures, and transported into the lymph. In contrast, MCT's are rapidly hydrolyzed to medium chain fatty acids which are then absorbed into the portal vein and oxidized by the liver. As a result, the body tends to treat the energy from MCT's similarly to the energy from carbohydrates. MCT's contain at least about 10% fewer calories than most triglycerides found in vegetable oils and animal fats as determined by bomb calorimetry. Additionally, because the body is inefficient in converting MCT's to body fat, the metabolizable or net calories that MCT's provide are actually lower than the 10% reduction predicted by conventional measurements. Therefore, it is highly desirable to include MCT's as the oil component in a peanut butter product.

Specifically, MCT's are triglycerides in which the glycerol group is completely esterified with one or more of the following fatty acids: $C_{6:0}$ (caproic), $C_{8:0}$ (caprylic), $C_{10:0}$ (capric), and $C_{12:0}$ (lauric). The lauric acid is generally present in amounts of about 2% or less. A typical MCT fatty acid composition is about 2–4% $C_{6:0}$, about 50–75% $C_{8:0}$, about 25–43% $C_{10:0}$, and about 0.5–2% $C_{12:0}$.

For purposes of the present invention, by "medium chain triglycerides" is meant triglycerides completely esterified with fatty acids selected from the group consisting of caproic, caprylic, capric, lauric, and mixtures thereof, where the level of lauric acid is not more than about 5%, preferably not more than about 2%. Preferably the medium chain triglycerides have the following fatty acid composition: from about 0% to about 15% $C_{6:0}$, from about 40% to about 85% $C_{8:0}$, from about 15% to about 55% $C_{10:0}$, and from about 0% to about 5% $C_{12:0}$.

Preferably, at least about 12% by weight of the triglycerides in the continuous oil phase are medium chain triglycerides, more preferably at least about 35%, more preferably at least about 60%, more preferably at least about 75%, more preferably at least about 90%, more preferably at least about 96%, and most preferably about 100%.

A more detailed discussion on medium chain triglycerides is found in the following references: Bach et al., "Medium-Chain Triglycerides: an Update," *The American Journal of Clinical Nutrition* 36, November 1982, pp. 950–962; and Senior, *Medium Chain Triglycerides*. University of Pennsylvania Press, Philadelphia, PA (1968), both incorporated by reference herein.

Fatty Acids Other Than Medium Chain Fatty Acids

Besides medium chain fatty acids, the present triglycerides can be esterified with any of the fatty acids typical of fats and oils. In a preferred embodiment of the invention, however, the remaining fatty acids are long chain fatty acids.

By "long chain fatty acids," as used herein, is meant saturated or unsaturated $C_{17}$ to $C_{26}$ fatty acids: $C_{17:0}$ (margaric), $C_{18:0}$ (stearic), $C_{18:1}$ (oleic or ricinoleic), $C_{18:2}$ (linoleic), $C_{18:3}$ (linolenic, licanic or eleostearic), $C_{18:4}$ (octadecatetraenoic), $C_{19:0}$ (nonadecanoic), $C_{20:0}$ (arachidic), $C_{20:1}$ (eicosenoic), $C_{20:2}$ (eicosadienoic), $C_{20:4}$ (arachidonic), $C_{20:5}$ (eicosapentaenoic), $C_{21:0}$ (heneicosanoic), $C_{22}$ (behenic), $C_{22:1}$ (erucic), $C_{22:2.5}$ (docosapolyenoic), $C_{23:0}$ (tricosanoic), $C_{24:0}$ (tetracosanoic), $C_{24:6}$ (nisinic), $C_{25:0}$ (pentacosanoic), $C_{26:0}$ (certoic), and $C_{26:5}$ (shibic).

Polymorphic stability of the triglycerides in a peanut butter product is best achieved by using predominantly unsaturated rather than saturated long chain fatty acids. If they contain too many long chain saturated fatty acids, the crystal structure of these triglycerides can change from beta prime to beta in a peanut butter after several weeks of storage, causing an undesirable hardening of the peanut butter.

Therefore, the present triglycerides esterified with combinations of medium chain and long chain fatty acids preferably have the following fatty acid composition by weight percent:
   (a) from about 15% to about 70% saturated $C_6$ to $C_{10}$ fatty acids;
   (b) from about 10% to about 65% unsaturated $C_{17}$ to $C_{26}$ fatty acids;
   (c) from about 0% to about 20% saturated $C_{17}$ to $C_{26}$ fatty acids; and
   (d) from about 0% to about 10% fatty acids selected from the group consisting of saturated $C_{12}$ to $C16$ fatty acids and unsaturated $C_{12}$ to $C_{16}$ fatty acids, and mixtures thereof.

For optimum polymorphic stability, the ratio of saturated to unsaturated $C_{17}$ to $C_{26}$ fatty acids is preferably not more than about 1:3, and most preferably not more than about 1:4.

From a nutritional standpoint, it is preferred that the present peanut butter contain from about 5% to about 25% linoleic acid ($C_{18:2}$) and up to about 15% linolenic acid ($C_{18\ 3}$). These essential fatty acids can be introduced either as part of the triglycerides containing combinations of medium chain and long chain fatty acids, or from another triglyceride source in the peanut butter (e.g., peanut oil is high in $C_{18:2}$).

For a peanut butter product that is used shortly after manufacture, polymorphic instability is not a problem. Therefore, the triglycerides esterified with combinations of medium chain and long chain fatty acids can also contain a large percentage of saturated long chain fatty acids. The use of saturated long chain fatty acids provides additional calorie reduction benefits, because they are only partially absorbed by the body. These triglycerides have the following fatty acid composition by weight percent:
   (a) from about 15% to about 70% saturated $C_6$ to $C_{10}$ fatty acids;
   (b) from about 0% to about 20% unsaturated $C_{17}$ to $C_{26}$ fatty acids;
   (c) from about 3% to about 65% saturated $C_{17}$ to $C_{26}$ fatty acids; and
   (d) from about 0% to about 10% fatty acids selected from the group consisting of saturated $C_{12}$ to $C_{16}$ fatty acids and unsaturated $C_{12}$ to $C_{16}$ fatty acids, and mixtures thereof.

The triglycerides esterified with combinations of medium chain and long chain fatty acids can be prepared by a wide variety of techniques such as:
   (a) random rearrangement of long chain triglycerides and medium chain triglycerides;
   (b) esterification of glycerol with a blend of the corresponding fatty acids; and
   (c) transesterification of a blend of medium and long chain fatty acid methyl esters with glycerol.

Random rearrangement of triglycerides is well-known in the art, as is the esterification of glycerol with fatty acids. For discussions on these subjects, see Hamilton et al., *Fats and Oils: Chemistry and Technology*. pp. 93–96, Applied Science Publishers Ltd., London (1980), and Swern, *Bailey's Industrial Oil and Fat Products*. 3d ed., pp. 941–943 and 958–965 (1964), both disclosures incorporated by reference herein. Transesterification is also discussed generally in Bailey's at pp. 958–963.

Fatty acids per se or naturally occurring fats and oils can serve as the source for the fatty acid component of the triglycerides of the present invention. For example, linoleic acid ($C_{18:2}$) is a major component of safflowerseed oil, sunflowerseed oil, cottonseed oil, corn oil and soybean oil. Linolenic acid ($C_{18:3}$) is found in linseed oil and perilla oil. Rapeseed oil provides a good source for behenic acid ($C_{22:0}$). Medium chain fatty acids can be obtained from coconut, palm kernel, or babassu oils, or they can be obtained from medium chain triglycerides. Commercial medium chain triglycerides are sold by Capital City Products, Dept. TR, P.O. Box 569, Columbus, OH 43216, under the brand names Captex 200, 300 and 355.

The continuous oil phase of the present peanut butter comprises triglycerides containing at least about 10% medium chain fatty acids as described hereinabove. However, it is not necessary that all the triglycerides in the oil phase contain medium chain fatty acids, as long as the triglycerides as a whole contain at least about 10% medium chain fatty acids. For example, it is difficult to completely remove peanut oil from peanut paste; therefore, the oil phase generally contains about 2% or more peanut oil. If desired, other animal or vegetable fats or oils can be added to the oil phase provided they do not interfere with the desirable consistency and organoleptic properties of the peanut butter. As discussed below, the peanut butter generally contains up to about 5% of a stabilizer consisting of a fully or partially hydrogenated triglyceride such as rapeseed oil. Some unhydrogenated or slightly hydrogenated triglyceride oils can also be added if desired.

Various fat substitutes can also be used in the oil phase of the present peanut butter provided they do not adversely affect the textural benefit of the invention. Examples of such materials are: fatty alcohol esters of polycarboxylic acids (U.S. Pat. No. 4,508,746 to Hamm, assigned to CPC International, Inc., issued April 2, 1985); fatty polyethers of polyglycerol (U.S. Pat. No. 3,932,532 of Hunter et al., assigned to ICI United States, Inc., issued January 13, 1976) (food use disclosed in German Pat. No. 207,070, issued February 15, 1984)); ethers and ether-esters of polyols containing the neopentyl moiety (U.S. Pat. No. 2,962,419 of Minich, issued Nov. 29, 1960); fatty alcohol diesters of dicarboxylic acids such as malonic and succinic acid (U.S. Pat. No. 4,582,927 of Fulcher, assigned to Frito-Lay, Inc., issued April 15, 1986); triglyceride esters of alpha branched chain-alkyl carboxylic acids (U.S. Pat. No. 3579,548 of Whyte, assigned to The Procter & Gamble Co., issued May 18, 1971); N-Oil; jojoba oil; and sugar and sugar alcohol fatty acid polyesters (U.S. Pat. No. 3,600,186 of Mattson and Volpenhein, assigned to Procter & Gamble, issued August 17, 1971), all incorporated herein by reference.

Additional Peanut Butter Ingredients

The present peanut butter is comprised of peanut paste, stabilizer, and optionally other ingredients such as emulsifier, sweetener, and salt. The peanut butter comprises from about 75% to about 99% by weight peanut paste. This ingredient is ordinarily obtained by conventional methods of roasting and blanching raw peanuts and then grinding them. The resulting peanut paste is a mixture of peanut particles and oil which have been released from the cellular structure of the nuts during the grinding operation. At least a portion of the oil is replaced by triglycerides containing medium chain fatty acids, as discussed hereinabove. Methods for replacing the peanut oil are discussed in detail below.

The peanut butter also comprises from about 1% to about 5% by weight stabilizer, normally comprising a hydrogenated fatty material. It stabilizes the peanut paste against separation of oil and solid components. The stabilizer can include nearly any edible glyceride fat solid or semisolid. Partially or completely hydrogenated natural fats such as peanut oil, corn oil, cottonseed oil, linseed oil, palm oil, whale oil, and other marine oils, alone or in combination, are very suitable to provide stabilizers. One preferred type of stabilizer is rapeseed oil having an iodine value not greater than about 10; the use of this stabilizer is described in U.S. Pat. No. 3,129,102 to Sanders, incorporated by reference herein. Other preferred stabilizers are described in U.S. Pat. No. 3,265,507 to Japikse, incorporated by reference herein; for example, this patent discloses stabilizer compositions comprising substantially fully hydrogenated soybean oil and substantially fully hydrogenated rapeseed oil in weight ratios from about 3:7 to about 7:3.

The peanut butter can optionally comprise from about 0.5% to about 1.5% by weight emulsifiers. These emulsifiers function in the peanut butter to negate stickiness so that the peanut butter will not stick to the roof of the mouth. Suitable emulsifiers include lecithin and fatty mono- and diglycerides, for example, soybean mono- and diglycerides.

The present peanut butter can optionally also comprise from about 1% to about 10% by weight added sweetener. Suitable sweeteners include, for example, sucrose, dextrose, fructose, honey, molasses, polydextrose, aspartame, saccharin, and other common sweetening agents.

The peanut butter composition can also additionally comprise from about 1% to about 1.5% by weight salt as a flavoring agent.

Although the present invention is not limited by the processing method, typically peanuts having been roasted and blanched are ground to a particle size found in conventional peanut paste. The paste is then processed to remove a portion of the peanut oil and replace it with triglycerides containing medium chain fatty acids. Then the other peanut butter ingredients are added to provide a homogeneous mixture. It is preferred that the processing stream be maintained in an inert atmosphere, e.g. a nitrogen atmosphere, starting just before the grinding step and continuing throughout the remainder of the process. The homogeneous mixture with its stabilizer components in molten state is subjected to processing to properly crystallize the stabilizer. Ordinarily the stabilizer is in molten state when the homogeneous mixture is at a temperature greater than 100° F. (38° C.). The crystallization is carried out by cooling the homogeneous mixture from this temperature, for example, in a scraped wall heat exchanger and then subjecting the mixture to agitation, for example, in a picker. After being processed through the picker the product is ordinarily introduced into containers by a filler, then tempered.

The peanut paste herein can be prepared in a number of ways. For example, it can be prepared by utilizing multiple passes of peanuts through a conventional grinder or other device such as comminuters, attrition mills, disintegrators, hammermills, or colloid mills.

The extent of grinding can be adjusted to produce a peanut butter that is smooth, regular or chunky in texture. Smooth peanut butter has a fine, non-grainy texture, while regular peanut butter has a grainy texture with small peanut particles. Chunky peanut butter contains substantial amounts of peanut particles larger than 1/16 inch in diameter. The chunky peanut butter can be made by rough grinding the paste or by mixing chopped nuts with a smooth peanut butter. If desired, the chopped nuts can be defatted to reduce calories.

Reduction in Total Oil

As discussed hereinabove, the present peanut butter can contain a lower level of total oil while maintaining an excellent consistency. For example, when medium chain triglycerides are used to replace peanut oil in the present invention, a 96% replacement of peanut oil by MCT's allows about a 2% reduction in total oil while maintaining the same consistency.

The present peanut butter preferably has at least about a 1% reduction in total oil compared to the same peanut butter without peanut oil replacement, more preferably at least about 2%. The following tables illustrate the broad, preferred, and most preferred composition ranges of the present peanut butter at the different oil reduction levels:

| Composition: 20–70% Oil Phase, 30–80% Peanut Particles | | |
|---|---|---|
| % Oil Reduction | Oil Phase | Peanut Particles |
| 0% | 20–70% | 30–80% |
| 1% | 20–69.5% | 30.5–80% |
| 2% | 19.5–68.5% | 31.5–80.5% |

| Composition: 30–60% Oil Phase, 40–70% Peanut Particles | | |
|---|---|---|
| % Oil Reduction | Oil Phase | Peanut Particles |
| 0% | 30–60% | 40–70% |
| 1% | 29.5–59.5% | 40.5–71.5% |
| 2% | 29.5–59% | 41–71.5% |

| Composition: 35–55% Oil Phase, 45–65% Peanut Particles | | |
|---|---|---|
| % Oil Reduction | Oil Phase | Peanut Particles |
| 0% | 35–55% | 45–65% |
| 1% | 34.5–54.5% | 45.5–65.5% |
| 2% | 34.5–54% | 46–65.5% |

Methods for Peanut Oil Extraction

There are various methods of replacing the peanut oil found in peanut butter paste with triglycerides containing medium chain fatty acids, and the invention is not limited by the method. The peanut oil is first extracted from the paste, usually by physical and/or solvent processes.

The recovery of peanut oil from peanuts and processes for making defatted peanuts are disclosed in Woodruff, *Peanuts—Production. Processing. Products.* 3rd Ed., pp. 294–302, The Avi Publishing Co., Inc. (1983), incorporated by reference herein. The recovery of peanut oil from peanuts is usually done by hydraulic press, expeller, or solvent extraction, or combinations of these.

U.S. Pat. No. 4,049,833 of Gannis et al. (incorporated by reference herein) discloses a process for partially defatting nuts, in which blanched peanuts having an oil content of 48 to 50 percent are pressed in a hydraulic press at a pressure of 2,000 psi until about 50 percent of the oil is removed from the nuts. U.S. Pat. No. 4,329,375 of Holloway, Jr. et al. (incorporated by reference herein) discloses a process for removing peanut oil by pressing in a Carver press at applied pressures of greater than about 1,000 psig for from about 15 to about 120 minutes. Pressures between about 1,500 psig and about 2,000 psig are preferred.

The following patents, all incorporated by reference herein, disclose methods of solvent extraction of peanut oil: U.S. Pat. No. 2,524,037 of Beckel et al., U.S. Pat. No. 2,645,650 of Ayers et al., U.S. Pat. No. 2,950,198 of King et al., U.S. Pat. No. 3,786,078 of Finley et al., U.S. Pat. No. 3,928,635 of Ohta et al., U.S. Pat. No. 4,008,210 of Steele et al., and U.S. Pat. No. 4,190,577 of Steele et al. Extraction with hexane is a preferred method.

A specific method of removing peanut oil from peanut paste found to be useful herein is the use of a hydraulic press followed by hexane extraction. A 75-ton hydraulic press that has an 8-inch ram is used. The press chamber can hold about 1,000 grams of peanut paste. The paste is placed into a cylinder that is lined with nylon cloth. The top of the cloth is then tied with string to make a bag containing the paste. A metal cap that fits inside the cylinder is placed on top of the bag of paste. The hydraulic pump is turned on and the cap is forced into the cylinder under 62 tons of pressure. The paste sample is held under pressure for 30 minutes. The cylinder containing the sample is positioned inside a 9" by 9" cake pan during the pressing operation. The pressure on the cylinder forces the peanut oil through the cloth, through a metal screen at the bottom of the cylinder, and into the cake pan. The peanut paste is then recovered from the cylinder. Approximately 80% of the oil is removed from the paste.

Next, the peanut paste which has been hydraulic extracted to remove all but 20% of the oil is ground to a fine powder using a Waring blender on the "chop" setting. 283 grams of the finely ground paste is placed into a beaker with 283 grams of hexane. The mixture is stirred 15 minutes, using a magnetic stirrer. The hexane is then removed by filtering the sample under a vacuum. This procedure is used two more times for each batch, using fresh hexane. At the end of the second extraction the peanut paste contains 2.7% peanut oil, and at the end of the third extraction the paste contains 2.1% peanut oil.

After extraction of the peanut oil from the paste, triglycerides containing medium chain fatty acids are added to the paste. For example, for a small peanut butter sample, 198 grams of peanut paste containing 3% peanut oil is mixed with 117 grams of medium chain triglycerides. These ingredients are blended together using a two-quart Hobart bowl and mixer. The ingredients are mixed one minute at speed #1, then three minutes at speed #3. The sample is then placed into a hot water bath and heated to 165° F. (74° C.). Lastly, the sample is stored at −10° F. (−23° C.) for 16 hours to initiate crystallization, then tempered at 80° F. (27° C.) for a minimum of 24 hours, then stored at 70° F. (21° C.).

Analytical Methods

I. Fatty Acid Composition

Principle

The fatty acid composition of the triglycerides of the present invention is measured by gas chromatography. First, fatty acid methyl esters of the triglycerides are prepared by any standard method (e.g., by transesterification using sodium methoxide), and then separated on a capillary column which is coated with DB-WAX stationary phase. The fatty acid methyl esters are separated by chain length and degree of unsaturation. A split injection is made with flame ionization detection. Quantitation is performed by use of a double internal standard method. This method can separate fatty acid methyl esters from $C_6$ to $C_{24}$.

| Equipment | |
|---|---|
| Gas Chromatograph | Hewlett-Packard 5890, or equivalent, equipped with a split injector and flame ionization detector, Hewlett Packard Co., Scientific Instruments Div., 1601-T California Ave., Palo Alto, CA 94304 |
| Autosampler Injector | Hewlett-Packard 7673A, or equivalent |
| Column | 15 m × 0.25 mm I.D., fused silica capillary column coated with DB-WAX (0.25 micron film thickness), J & W Scientific Co. |
| Data System | Hewlett-Packard 3350, 3000-T Hanover St., Palo Alto, CA 94304 |
| Recorder | Kipp & Zonen, BD40, Kipp & Zonen |
| Reagent | |
| Hexane | Burdick & Jackson, or equivalent, American Scientific Products |

Reference Standards

Two reference standards are used each day of operation to verify proper operation of this method. 1) A reference mixture of fatty acid methyl esters (FAME) is used to check the operation of the instrument. This reference mixture has the following fatty acid composition: 1% $C_{14:0}$, 4% $C_{16:0}$, 3% $C_{18:0}$, 45% $C_{18:1}$, 15% $C_{18:2}$, 3% $C_{18:3}$, 3% $C_{20:0}$, 3% $C_{22:0}$, 20% $C_{22:1}$, and 3% $C_{24:0}$. A reference standard of a commercial shortening is used to check the operation of the total system—methylation and gas chromatographic analysis. The shortening reference standard has the following fatty acid composition: 0.4% $C_{14:0}$, 21.4% $C_{16:0}$, 9.2% $C_{18:0}$, 40.3% $C_{18:1}$, 23.0% $C_{18:2}$, 2.2% $C_{18:3}$, 0.4% $C_{20:0}$, 1.3% $C_{20:1}$, and 0.3% $C_{22:0}$.

The reference mixture of FAME should be diluted with hexane and then injected into the instrument. A new vial of FAME reference mixture should be opened every day since the highly unsaturated components, $C_{18:2}$ and $C_{18:3}$, oxidize easily. The shortening reference standard should be methylated with the samples prior to their analysis by capillary gas chromatography. The results from the reference standards should be compared with the known values and a judgment made concerning the completed analysis. If the results of the reference standards are equal to or within ±2 standard deviations of the known values, then the equipment, reagents and operations are performing satisfactorily.

Operation

A. Instrumental Set-up

1. Install the column in the gas chromatograph, and set up the instrumental conditions as in Table 1.
2. Set up the data system with the appropriate method to acquire and analyze the data. The retention times may have to be adjusted in the method due to instrument variations. Consult the data system reference manual on how to do this—HP3350 User's Reference Manual. Unity response factors are used for each component.

3. Obtain the shortening reference standard for analysis with the samples and methylate it with the samples.

TABLE 1
INSTRUMENTAL CONDITIONS

| | |
|---|---|
| Instrument | Hewlett-Packard 5890 |
| Column | 15 m × 0.25 mm I.D., coated with DB-WAX, 0.25 u film thickness |
| Column head pressure | 12.5 psi |
| Carrier gas | Helium |
| Injector "A" temperature | 210° (410°) |
| Split vent flow | 100 mL/min |
| Septum purge | 1.5 mL/min |
| Oven temperature profile: | |
| Initial temperature | 110° C. (230° F.) |
| Initial time | 1 min |
| Rate 1 | 15°/min |
| Final temp 1 | 170° C. (338° F.) |
| Final time 1 | 0 min |
| Rate 2 | 6°/min |
| Final temp 2 | 200° C. (392°F.) |
| Final time 2 | 0 min |
| Rate 3 | 10°/min |
| Final temp 3 | 220° C. (428° F.) |
| Final time 3 | 8 min |
| Detector | FID |
| Detector temp | 230° C. (446° F.) |
| Make-up gas | 30mL/min |
| Detector H₂ flow | 30 mL/min |
| Detector air flow | 300 mL/min |

B. Analysis of Samples—(The samples are analyzed with a double internal standard procedure.)

1. Dilute the reference mixture of FAME with hexane. The methyl esters should be approximately 2% in hexane. Inject one microliter of this solution via the autosampler. The results must meet the criteria in the Reference Standards section.
2. Prepare the triglyceride samples to be analyzed by adding two internal standards, C9 and C21 triglycerides. (C9 and C21 triglycerides are commercial standards consisting of triglycerides esterified with 100% 9-carbon and 21-carbon fatty acids, respectively.) The internal standards are added to the samples at 10% by weight of the sample. The samples (including the internal standards) are then converted to methyl esters by transesterification using sodium methoxide or another standard method.
3. Set up a sequence in the LAS data system to inject the samples.
4. Activate the autosampler to inject 1.0 uL of the samples in the sequence. The gas chromatograph will automatically begin its temperature program and the data system will collect and analyze the data for the sequence.
5. The data is analyzed with two internal standard procedures. The absolute amount (mg of esters per gram of sample) of the $C_6$ through C16 components is calculated from the C9 internal standard. The absolute amount of the C18, C20, C22 and C24 components is calculated from the C21 internal standard. Weight percentages of fatty acids are calculated from these amounts.

II. Penetration

A. Scope

Applicable to finished peanut butter, creamy and crunchy.

B Principle

Penetration is a measure of the firmness or consistency of a peanut butter expressed as the distance that a 47-gram needle vertically penetrates the sample under known conditions of time and temperature, after the needle is dropped from a height of 2 centimeters above the surface of the peanut butter. A standard method for measuring penetration is described in A.O.C.S. Official Method Cc 16–60 (incorporated by reference herein). However, the method for measuring penetration values of the present invention is modified in several respects, for example, a modified Precision Universal Penetrometer (manufactured by Precision Scientific Co., Chicago, IL) is used to measure the penetration. The penetrating device comprising the shaft and needle (or "cone") is also modified.

C. Limitations

A large amount of entrained air will affect peanut butter consistency and cause abnormal penetrometer readings. Penetration on top of a peanut granule will give an abnormally low reading.

D. Apparatus

| | |
|---|---|
| Constant temperature box or room | Automatically controlled to maintain 70° F. (21° C.) ± 1° F. (1° C.). |
| Needle, shaft and collars | A specially designed needle, shaft and collars weighing 47 grams total. |
| Thermometer | Includes range of 65° to 90° F., (18° to 32° C.) with 1° F. (1° C.) divisions. |
| Penetrometer | Precision Universal penetrometer modified as described below. |

Specially Designed Needle. Shaft and Collars

The penetrating device comprises a shaft and needle (or "cone"). A 9" long hollow steel rod having a 3/16" outer diameter is used for the shaft. At the end of the shaft is a 2" long hollow stainless steel needle or cone. The shaft is attached at the end of the needle opposite the point (the enlarged end), in the manner of an arrow. The point end of the needle has a 1/32" diameter, and the enlarged end has a 19/32' diameter. Two adjustable magnesium collars are positioned around the shaft, the collars being ⅛" in diameter and 1/8" thick, and being adjustable along the length of the shaft by the use of set screws. The penetrating device as a whole, including the collars, weighs 47 grams.

Precision Universal Penetrometer (Modified)

The penetrometer is a mechanical device which provides in one unit a support or housing to grip and release the penetrating device (shaft and needle), a platform to support the sample, spirit level and adjustments to maintain the penetrometer in a level position and a depth gauge graduated to allow reading the depth of penetration in 0.1 mm units. Modification: In placing the shaft and needle in the housing of the instrument, the contact finger on the depth gauge is positioned below the bottom collar. The two collars are adjusted on the shaft so as to allow the depth gauge its full travel of 520 units. This is accomplished by moving the shaft upward until the cone is about two centimeters below the bottom of the housing and then sliding the top collar up against the top of the and tightening the set screw. Next the shaft is lowered exactly two centimeter and with the depth gauge raised all the way up and the indicator adjusted to read zero, the bottom collar is firmly tightened in place in contact with the finger on the depth gauge.

E. Conditioning of Sample

Peanut butter samples are tempered at 80° F. (27° C.)±2° F. (1° C.) for 24 hours, then stored at 70° F. (21° C.)±1° F. (1° C.) for a minimum of 16 hours, prior to measuring penetration.

F. Checking the Penetrometer—Check the needle rise against the 2 cm. gauge block as follows:
1. With the indicator and depth gauge in the zero position, lower the penetration head by means of the course adjusting screw until the point of the needle just touches the pad block (large diameter block), then lock penetration head in this position.
2. Squeeze the clutch trigger and raise the needle to the extreme top position.
3. Check the distance between the needle point and pad by placing the 2 cm. gauge block on the pad and carefully passing it under the needle point. The needle point should just clear the 2 cm. gauge block.
4. If the distance is not exactly 2 cm., adjust the top collar on the penetration needle until the rise and fall is exactly 2 cm. This check should be made once before each series of measurements.

G. Operation
1. Check that penetrometer is level.
2. Zero the dial indicator by squeezing the clutch trigger and pulling up on the depth gauge until it stops. If the indicator does not reach zero, adjust with zero setting screw.
3. Place the open jar of conditioned peanut butter onto the shelf of the penetrometer. By means of the coarse adjustment screw bring the needle down until its point just touches the surface of the sample. Do not scrape or disturb the surface of the sample.
4. Grasp the top of the needle shaft, squeeze the clutch trigger and gently pull the needle up as far as it will go. This will raise the needle two centimeters above the sample. Release the clutch trigger.
5. Push the depth gauge down gently as far as it will go.
6. Release (drop) the needle by squeezing the clutch trigger. Allow the needle to settle for exactly 10 seconds before releasing the clutch trigger.
7. Pull the depth gauge up until it stops. Read the dial. The reading is the penetration in tenths of a millimeter.
8. For creamy peanut butter make 1 penetration per jar. The penetration point should be at least ¾ inch from the side of the jar. Be certain to clean the needle by wiping with a tissue between each penetration.
9. For crunchy peanut butter make 5 penetrations per jar. The penetration points should be at least ¾ inch from the side of the jar and as equally spaced as possible. Do not penetrate on top of a granule. Penetration=highest value obtained.

The following examples are intended only to further illustrate the invention and are not intended to limit the scope of the invention which is defined by the claims.

EXAMPLE 1

A peanut butter is prepared as described below. The defatted peanut paste has been multiple solvent extracted with hexane to remove all but 2.61% of the peanut oil. The medium chain triglycerides (MCT's) have the following fatty acid composition: 2.9% $C_{6:0}$, 68.6% $C_{8:0}$, 27.9% $C_{10:0}$ and 0.6% $C_{12:0}$ (Captex 300, Capital City Products). The peanut butter has the following composition:

| Ingredient | % |
|---|---|
| Defatted peanut paste (2.61% residual peanut oil) | 48.44 |
| MCT's | 41.96 |
| Sugar (12×) | 5.8 |
| Soybean and rapeseed hardstock | 1.4 |
| Salt | 1.2 |
| Mono-and diglyceride emulsifier | 0.7 |
| Molasses | 0.5 |

All the ingredients except the peanut paste are placed into a 600 ml. beaker. The beaker is placed into a hot water bath and heated to 165° F. (74° C.) until all the ingredients are melted. The mixture is then placed into a Waring blender, the peanut paste is added, and the mixture is blended about 2 minutes at "grate" speed until the product is smooth. After blending, the product is returned to the hot water bath and heated to 165° F. (74° C.). The peanut butter is then placed into a −1° F. (−23° C.) constant temperature room for 6 hours, then tempered by storage at 80° F. (17° C.) for 24 hours. Lastly, the peanut butter is packaged and stored at 70° F. (21° C.). The peanut butter product has an excellent consistency, and it contains at least about 10% fewer calories by bomb calorimetry per serving than a conventional peanut butter of equivalent consistency.

EXAMPLE 2

Peanut butter compositions are prepared with varying ratios of medium chain triglycerides and peanut oil. The medium chain triglycerides (MCT's) and defatted peanut paste are the same as in Example 1.

a. Change in Consistency

The following base mixes are made to determine the change in consistency as the ratio of MCT's to peanut oil changes. The total oil in each base mix is held constant (43.61 grams).

| | (1) | | (2) | | (3) | |
|---|---|---|---|---|---|---|
| | % | Gms. | % | Gms. | % | Gms. |
| Defatted peanut paste | 51.54 | 46.39 | 51.54 | 46.39 | 51.54 | 46.39 |
| MCT's | - | - | 17.50 | 15.75 | 20.00 | 18.00 |
| Peanut oil | 48.46 | 43.61 | 30.96 | 27.86 | 28.46 | 25.61 |

| | (4) | | (5) | |
|---|---|---|---|---|
| | % | Gms. | % | Gms. |
| Defatted peanut paste | 51.54 | 46.39 | 51.54 | 46.39 |
| MCT's | 22.50 | 20.25 | 25.00 | 22.50 |
| Peanut oil | 25.96 | 23.36 | 23.46 | 21.11 |

| Sample No. | (1) | (2) | (3) | (4) | (5) |
|---|---|---|---|---|---|
| % Peanut oil replaced by MCT's | 0 | 35 | 40 | 45 | 50 |
| % MCT's (% of formula) | 0 | 15.75 | 18.00 | 20.25 | 22.50 |
| MCT/peanut oil ratio | 0 | 0.57 | 0.70 | 0.87 | 1.07 |

Peanut butter compositions are made by combining the base mixes with other ingredients as follows:

| Ingredient | Amount (gms.) |
|---|---|
| Base mix | 90.00 |
| Sugar (12×) | 5.80 |
| Soybean and rapeseed hardstock | 1.40 |
| Mono- and diglyceride emulsifier | 0.70 |
| Salt | 1.20 |
| Peanut oil | 0.40 |
| Molasses | 0.50 |

All ingredients except the peanut paste and molasses are placed into a 250 ml. beaker and heated to 165° F. (74° C.) in a steam bath. The heated mixture is placed into a Waring blender, the peanut paste is added, and the mixture is blended about 3 minutes at the "grate" speed setting. The molasses is added and the ingredients are blended about 2 more minutes. The mixture is returned to the steam bath and heated to 165° F. (74° C.). Next the mixture is placed into an 8 ounce jar and held at 0° F. (−18° C.) for 16 hours. Then the mixture is tempered at 80° F. (27° C.) for 24 hours. After tempering, the peanut butter is stored at 70° F. (21° C.).

The peanut butter samples are measured for their penetration values. Penetration has been found to correlate with consistency of the peanut butter in the mouth. (Up to a penetration value of about 295 mm, the higher the penetration the better the mouthfeel.) The following results are obtained:

| Sample: | (1) | (2) | (3) | (4) | (5) |
|---|---|---|---|---|---|
| Penetration: | 144 | 152 | 171 | 175 | 185 |
| MCT/peanut oil ratio | 0 | 0.57 | 0.70 | 0.87 | 1.07 |

It is seen that the penetration of the samples increases with an increase in the ratio of MCT's to peanut oil, even though the amount of total oil (peanut oil+MCT's) remains the same. Therefore, through the addition of MCT's, the desired consistency of the peanut butter can be maintained even at a lower level of total oil.

b. Varying Levels of Total Oil

Peanut butter samples are made as described above, but the level of total oil is varied. Half the samples contain MCT's and peanut oil, while the other half contain 100% peanut oil. The samples are measured for penetration and the following results are obtained:

| Sample | Total Oil Level | Penetration |
|---|---|---|
| (1) | 42.33% (100% peanut oil) | 141.5 |
| (2) | 42.33% (96% MCT's, 4% peanut oil) | 161 |
| (3) | 39.14% (100% peanut oil) | 90 |
| (4) | 39.14% (95.43% MCT's, 4.57% peanut oil) | 99.5 |

From the results, it is seen that for a given level of total oil, the samples made with MCT's have significantly higher penetration measurements than the samples made with 0% peanut oil. The difference is even more pronounced at the higher total oil levels.

EXAMPLE 3

A peanut butter is prepared as in Example 1, except that triglycerides containing combinations of medium and long-chain fatty acids are used instead of MCT'S. The tailored medium chain triglycerides have the following approximate fatty acid composition: 1.5% $C_{6:0}$, 36.4% $C_{8:0}$, 14.8% $C_{10:0}$, 0.3% $C_{12:0}$, 3.5% $C_{18:0}$, 3.5% $C_{20:0}$, 38.7% $C_{22:0}$, and 1.3% $C_{24:0}$. The peanut paste has been hydraulic pressed but not solvent extracted. The ingredients are combined in the following percentages:

| Ingredient | % |
|---|---|
| Defatted peanut paste (16% residual oil) | 52.63 |
| Tailored medium chain triglycerides | 38.77 |
| Peanut oil | 0.40 |
| Sugar (12X) | 5.80 |
| Salt | 1.20 |
| Mono- and diglyceride emulsifier | 0.70 |
| Molasses | 0.50 |

The peanut butter product has an excellent consistency when fresh, but it stiffens after two weeks of storage. The same peanut butter made with triglycerides containing long chain unsaturated instead of saturated fatty acids retains its excellent consistency after prolonged storage.

What is claimed is:

1. A peanut butter comprising a dispersion of finely divided peanut particles in a continuous oil phase, wherein the oil phase comprises triglycerides containing at least about 30% medium chain fatty acids.

2. A peanut butter according to claim 1 wherein the triglycerides contain at least about 50% medium chain fatty acids.

3. A peanut butter according to claim 2 wherein the triglycerides contain at least about 70% medium chain fatty acids.

4. A peanut butter according to claim 1 comprising from about 20% to about 70% by weight continuous oil phase and from about 30% to about 80% by weight peanut particles.

5. A peanut butter according to claim 4 comprising from about 35% to about 55% by weight continuous oil phase and from about 45% to about 65% by weight peanut particles.

6. A peanut butter according to claim 4 wherein the ratio of continuous oil phase to peanut particles is from about 40:60 to about 50:50.

7. A peanut butter according to claim 5 to comprising from about 34.5% to about 54.5% by weight continuous oil phase and from about 45.5% to about 65.5% by weight peanut particles.

8. A peanut butter according to claim 5 comprising from about 34.5% to about 54% by weight continuous oil phase and from about 46% to about 65.5% by weight peanut particles.

9. A peanut butter according to claim 4 additionally comprising from about 1% to about 5% by weight stabilizer.

10. A peanut butter according to claim 9 comprising:
(a) from about 20% to about 70% by weight continuous oil phase;
(b) from about 30% to about 80% by weight peanut particles;

(c) from about 1% to about 5% by weight stabilizer;
(d) from about 0.5% to about 1.5% by weight emulsifier;
(e) from about 1% to about 12% by weight sweetener; and
(f) from about 1% to about 1.5% by weight salt.

11. A peanut butter according to claim 1 wherein at least about 12% by weight of said triglycerides are medium chain triglycerides.

12. A peanut butter comprising a dispersion of finely divided peanut particles in a continuous oil phase, wherein the oil phase comprises triglycerides containing at least about 10% medium chain fatty acids, and wherein at least about 35% of said triglycerides are medium chain triglycerides.

13. A peanut butter according to claim 12 wherein at least about 60% of said triglycerides are medium chain triglycerides.

14. A peanut butter according to claim 13 wherein at least about 90% of said triglycerides are medium chain triglycerides.

15. A peanut butter according to claim 14 wherein about 100% of said triglycerides are medium chain triglycerides.

16. A peanut butter according to claim 12 wherein the medium chain triglycerides have the following fatty acid composition by weight percent: from about 0% to about 15% $C_{6:0}$, from about 40% to about 85% $C_{8:0}$, from about 15% to about 55% $C_{10:0}$, and from about 0% to about 5% $C_{12:0}$.

17. A peanut butter according to claim 1 wherein said triglycerides have the following fatty acid composition by weight percent:
  (a) from about 15% to about 70% saturated $C_6$ to $C_{10}$ fatty acids;
  (b) from about 10% to about 65% unsaturated $C_{17}$ to $C_{26}$ fatty acids;
  (c) from about 0% to about 20% saturated $C_{17}$ to $C_{26}$ fatty acids; and
  (d) from about 0% to about 10% fatty acids selected from the group consisting of saturated $C_{12}$ to $C_{16}$ fatty acids and unsaturated $C_{12}$ to $C_{16}$ fatty acids, and mixtures thereof.

18. A peanut butter according to claim 1 wherein said triglycerides have the following fatty acid composition by weight percent:
  (a) from about 15% to about 70% saturated $C_6$ to $C_{10}$ fatty acids;
  (b) from about 0% to about 20% unsaturated $C_{17}$ to $C_{26}$ fatty acids;
  (c) from about 3% to about 65% saturated $C_{17}$ to $C_{26}$ fatty acids; and
  (d) from about 0% to about 10% fatty acids selected from the group consisting of saturated $C_{12}$ to $C_{16}$ fatty acids and unsaturated $C_{12}$ to $C_{16}$ fatty acids, and mixtures thereof.

* * * * *